May 5, 1942.  E. E. CASSIDY  2,282,117
DAYLIGHT LOADING FILM RECEPTACLE
Filed March 28, 1940  3 Sheets-Sheet 1
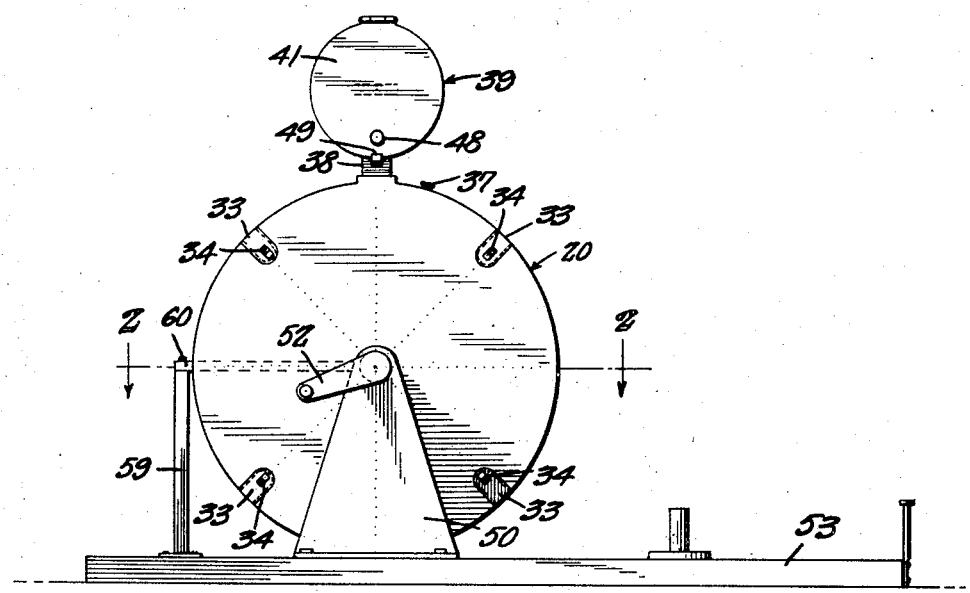
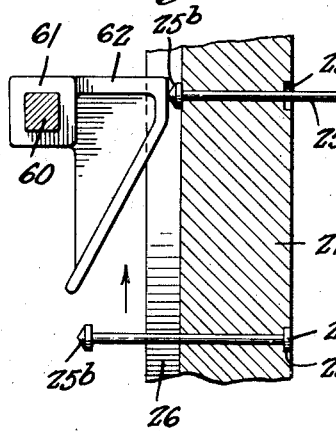
Edward E. Cassidy, INVENTOR
BY Victor J. Evans & Co.
ATTORNEYS

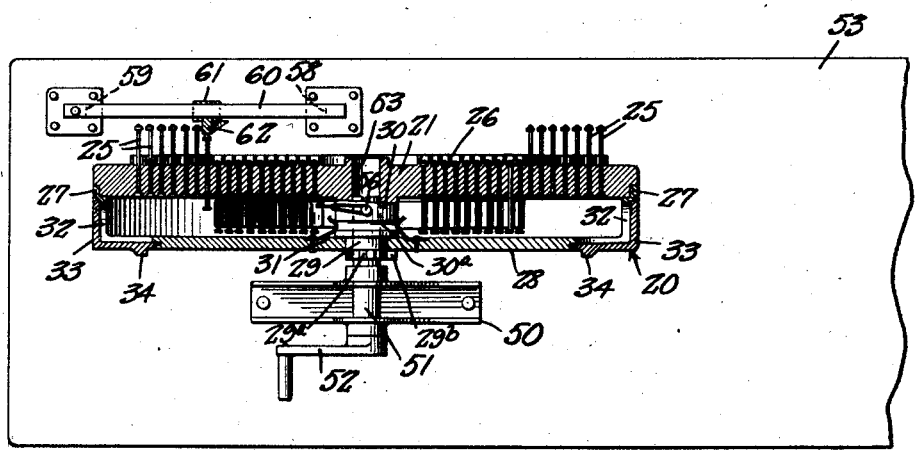
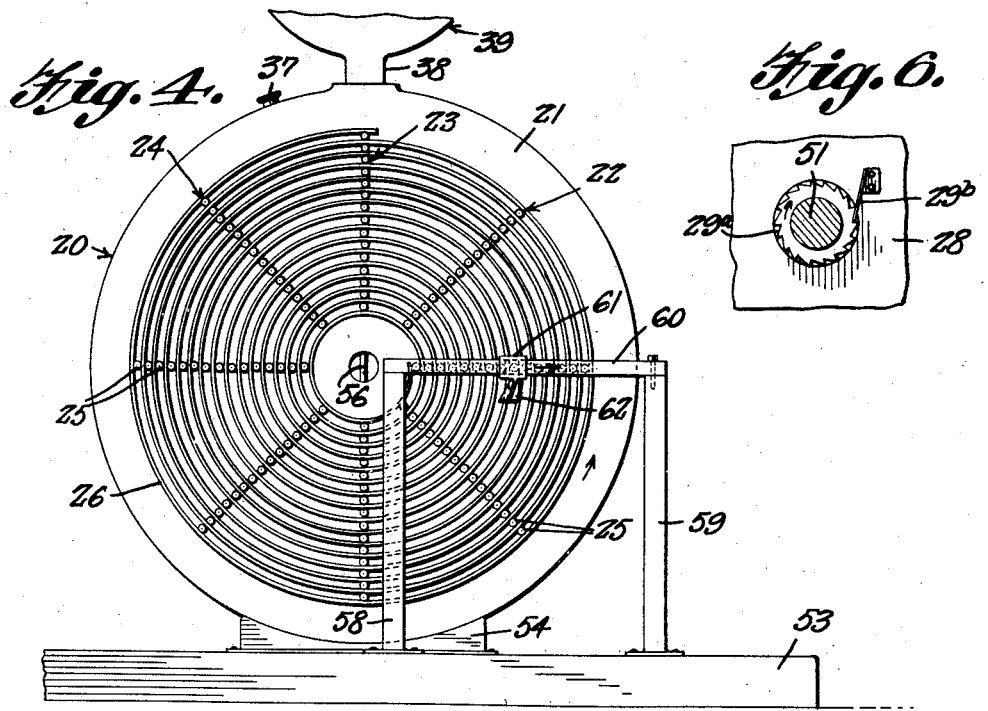

May 5, 1942.  E. E. CASSIDY  2,282,117
DAYLIGHT LOADING FILM RECEPTACLE
Filed March 28, 1940  3 Sheets-Sheet 3
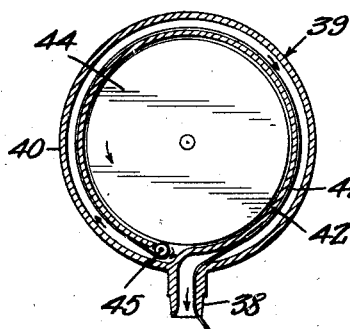
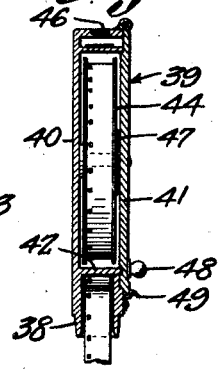
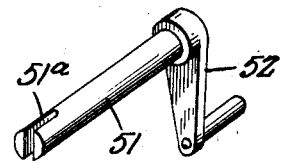
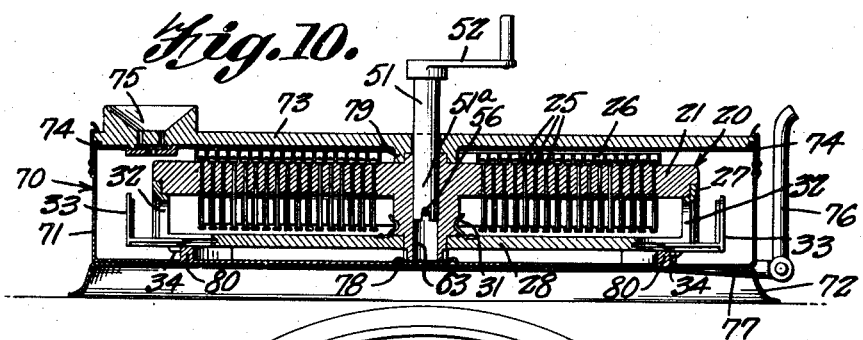

Patented May 5, 1942

2,282,117

UNITED STATES PATENT OFFICE 2,282,117

DAYLIGHT LOADING FILM RECEPTACLE

Edward E. Cassidy, Washington, D. C.

Application March 28, 1940, Serial No. 326,484

4 Claims. (Cl. 242—55)

This invention relates generally to improvements in receptacles for holding elongate strips of sheet material and particularly is concerned with a novel receptacle useful in holding photographic film such as movie film or the like for treatment in photographic processes.

Amateur makers of moving pictures presently are unable to process film because no practical means heretofore has been provided for the handling of long strips such as fifty or one hundred foot lengths in the manner which is common practice with shorter lengths of film. Particularly is this true concerning daylight loading tanks for sensitizing, developing, fixing or other treatment. The current practice as the present inventor understands it comprises winding a helix of film upon a drum and treating the film by dipping the rotating film in trays containing appropriate solutions.

It is the present object of this invention to provide a daylight loading receptacle for long lengths of film including a reel provided with novel means for supporting the length of film in a spiral within the receptacle.

Another object of this invention is to provide a reel carrying a plurality of movable pins adapted to serve as supports for film wound upon the reel in a manner such that the pins normally retracted may be moved in spiral succession to extended position, thus providing means for holding a spiral of film upon the reel with each of the loops of the spiral spaced with respect to each other loop.

A further object of this invention is to provide in combination with a reel a cover therefor including a series of ports normally closed by sliding gates and a tank adapted to receive the reel and cover provided with cams for opening the gates of said ports after the reel and cover have been enclosed light-tight in the tank.

An advantage of the novel film treatment apparatus according to this invention is that if desired a plurality of short lengths of film may be wound from separate light-tight cartridges onto the reel and the series developed or otherwise treated as a single length of film, thus permitting rapid treatment for the amateur of relatively large quantities of film.

Noteworthy among the features of the novel daylight loading film receptacle according to the present invention are its simplicity and ruggedness of construction, the former suiting the device to the requirements of manufacture under conditions of mass production and the latter assuring long useful life.

Other objects, advantages and features of the new and improved daylight loading film receptacle according to the present invention will be apparent to those skilled in this art during the course of the following description.

Regarded in certain of its broader aspects a novel device according to the present invention comprises a reel adapted to be rotatably mounted and provided with a plurality of pins mounted in parts of the reel in a manner permitting sliding in a direction substantially parallel to the axis of rotation of the reel; light-tight cover for said reel provided with apertures normally closed by sliding gates; means for slidingly moving supporting pins on said reel in spiral succession, and a tank for receiving said reel provided with means for opening the sliding gates of the cover thereof.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawings,

Figure 1 is substantially a side elevational view of the presently preferred embodiment of this invention showing the reel and cover mounted in the pin actuating apparatus as used in loading the reel, Fig. 2 is substantially a horizontal sectional view of Fig. 1 taken along the plane indicated by the line 2—2, Fig. 3 is substantially a vertical sectional view of the partially loaded reel and parts of the cartridge showing the same supported upon the device illustrated in Fig. 1, Fig. 4 is substantially a rear elevational view of the structure illustrated in Fig. 3, Fig. 5 is a fragmentary vertical sectional view of a portion of the reel and pin-moving mechanism, Fig. 6 is a detail elevational view of the ratchet on the reel cover, Fig. 7 is a vertical sectional view of the film cartridge, Fig. 8 is substantially a vertical sectional view of the film cartridge showing film positioned therein, Fig. 9 is a perspective view of the handle provided for manually operating the device, Fig. 10 is a vertical sectional view of the reel and cover showing the same in position within the light-tight treatment tank, and Fig. 11 is a top plan view of the tank with the cover removed.

The present invention in its broader aspects comprises the combination of three cooperating units, namely a film supporting reel and cover, an apparatus for facilitating daylight loading of the reel with photographic film, and a tank for receiving the reel and cover permitting treatment of film carried thereon. For convenience in disclosing this invention the elements thereof mentioned above will each be hereinafter described in the indicated sequence.

The structural details of the reel and cover therefor generally designated by the reference character 20 are best illustrated in Figs. 1 to 6 inclusive and Fig. 10 wherein it will be noted that the reel comprises a disc 21 preferably formed of molded plastic material such as Bakelite or the like. The disc 21 is provided with a plurality of angularly spaced rows 22, 23, 24 and other rows not numbered of radially spaced freely slidable pins, some of which are designated by the reference character 25. In Fig. 5 it will be noted that the pin 25 comprises a flattened head portion 25a on one end thereof and an essentially conical rider head 25b on the opposite end of the pin. It is especially to be observed that the pin head 25a is received in a recess 25c formed in the surface of the disc 21 in a manner such that when the pin is in retracted position the head top rests flush with the surface of the disc. Each of the pins is identical with the pin 25 described and each pin is freely slidably mounted in the disc in a manner such that it may occupy the extended position illustrated by the upper pin 25 in Fig. 5 or, upon occasion, the retracted position illustrated by the lower pin 25 in the same figure of the drawings. A spiral groove 26 formed in one of the surfaces, which shall be hereinafter termed the outer surface of the disc 21, serves as a cam guide in a manner which will hereinafter be described for the purpose of permitting movement of pins from retracted to extended position in spiral sequence. An annular recess formed in peripheral parts of the disc 21 receives edge portions 27 of a shallow substantially cylindrical casing 28 in a manner such that free rotation of the disc with respect to the casing is permitted. Interengagement of the casing with the disc is facilitated by a tubular extension 29 carried upon the hub 30 formed integrally with the disc, said hub being provided with a peripheral groove 30a formed therein into which resilient fingers 31 are engageably received. For reasons which will be apparent during the course of the following description a ratchet 29a is formed upon the extreme end of the hub extension 29 and engages with an intrinsically resilient arm 29b on the casing 28 to restrict rotation of the disc with respect to the casing in one direction although permitting free rotation in the opposite direction.

The casing 28 is provided with openings 32 formed in peripheral parts thereof normally closed by sliding doors 33, said doors being provided with cam elements 34 for facilitating opening of the same as will be hereinafter described. A flanged opening 35 formed in a marginal part of the casing 28 is provided with a sliding gate 36 operable by a thumb screw 37 which can be moved into position closing the opening and, by reason of intrinsic qualities by which the gate is formed, hold a piece of film projecting through the opening. The opening is adapted to form a light-tight engagement with a tubular extension 38 of a cartridge generally designated by the reference character 39, details of which are best shown in Figs. 7 and 8 wherein it will be noted the cartridge comprises a casing 40 closed at the front by a swinging door 41 and having a partition 42 extending in spaced relation to the periphery of the casing from a place next to one side of the opening defined by the tubular member 38 above referred to. It is to be noticed that the partition in conjunction with the side of the casing defines a channel 43 extending around the interior of the casing to permit a reel of movie film 44 positioned within the casing to be withdrawn without having the film light-struck. The film is withdrawn through the opening of the tubular member 38 and is fed through the channel 43 being bent around a roller 45 mounted on the extreme end of the partition 42 substantially as shown. A window 46 is provided in the casing 40 for facilitating inspection of the film in order that winding of the film from the cartridge may be stopped before the extreme end of the film is reached. A leaf spring 47 is mounted upon the inner surface of the casing cover 41 to provide tension upon the film being withdrawn from the cartridge. A knob 48 is provided upon the front of the cover 41 for facilitating opening and closing same and to assure a tight closure. When the cover is in closed position a spring 49 mounted upon parts of the cartridge engages with the closed cover and holds same under pressure as will be obvious from an inspection of the drawings.

An upright standard 50 having aligned openings formed in the top portions thereof to receive a shaft 51 upon which is mounted a handle 52 is rigidly attached to a base board 53 and is of a height such that when the shaft 51 is positioned within the opening 63 in the hub 30, the casing 28 will rest upon a keyed supporting plate 54 with a key 55 formed on peripheral parts of the casing engaging with said plate. A cross piece 56 in the hub 30 engages with a bifurcated end portion 51a of the shaft 51 whereby it is possible, by operation of the handle 52, to rotate the disc 21 with respect to the casing 28 while the casing and disc are held in the relationship illustrated in Figs. 1 to 3 inclusive. By this means it is possible to withdraw film from the cartridge and wind the same upon the pins 25 as will hereinafter be described. A pair of upright supports 58 and 59 carrying a horizontal cross bar 60 are located behind the disc 21 in a manner such that the axis of the cross piece 60 extends in substantially parallel relation to a radius of the disc and a rider 61 is freely slidably mounted upon the cross member 60 to facilitate movement of the pins 25 by a cam 62 carried on the rider 61 received within the spiral groove 26 formed upon the rear surface of the disc. It is to be understood that as the disc 21 is rotated by means of the handle 52 the cam 62 rides in the spiral groove 26 thereby moving backwardly projecting pins 25 into forwardly projecting position in spiral sequence, thus permitting the operator to wind film upon the pins in a manner such that the wound film assumes a spiral configuration with the loops of the spiral spaced with respect to each other.

Referring now to Figs. 10 and 11 particularly, wherein details of the tank structure best are illustrated, it will be noticed that the tank generally designated by the reference character 70 comprises a tray 71 mounted upon a stand 72 provided with a cover 73 held in place by spring latches 74 substantially as shown. It is to be understood of course that the cover and casing interengage to form a substantially light-tight closure. A light-tight liquid opening generally designated by the reference character 75 is provided in the top 73 for facilitating the introduction of liquid into the interior of the tank and, for removal of liquid, a swinging spout 76 is provided upon a drain pipe 77, the spout and pipe being arranged with a valve whereby swinging of the spout into the upright position shown in Fig. 10 closes the valve, but movement of the spout into lowered position causes opening of the valve permitting draining of the tank. The tank bottom is provided with a raised portion 78 forming a recess for receiving the ratchet 29a on the extension 29 of the hub 30, thus facilitating positioning of the reel and cover in the center of the tank, and for holding the reel and cover so positioned while rotating, an annular formation 79 is provided upon the inner surface of the top 73 engaging with a flanged part of the hub 30 substantially as shown. Upwardly projecting cams 80 on the bottom of the tank engage with the cams 34 hereinabove described whereby, during rotation of the reel and cover within the tank, the gates 33 are moved from closed to opened position as illustrated in Fig. 10. It is to be noticed that an opening is provided in the top 73 to receive the shaft 51 in order that the reel and cover conveniently may be rotated by means of the handle 52.

Although the above described apparatus is susceptible to many uses which would be apparent to those skilled in this art and is in no wise limited to mere development or processing of film, the presently preferred mode of using the device will now be described. Film to be treated is loaded in the cartridge 39 with a portion of the film leader extending through the opening of the tubular member 38. The projecting end of the film is engaged with a suitable clip fastening 90 connected to the cross piece 56 and, the reel cover 28 being interengaged with the disc 21, the gates 33 being closed of course, loading of the reel can commence. Initially the pins 25 are positioned in a manner such that all project backwardly from the disc 21 and the rider 61 on the cross piece 60 is positioned at the inner end of the spiral groove 26. The reel is then rotated causing the rider to travel along the spiral groove and successively to position inwardly the pins 25 upon which the film withdrawn from the cartridge is wound. The operator observing through the window 46 sees rotation of the reel before the end of the film passes from the cartridge 39 and, closing the door 36, the free end portion of the film is held thus preventing unreeling within the receptacle. The cartridge is then removed from engagement with the casing 28 and the reel and casing assembly are inserted in the treatment tank generally designated by the reference character 70. Subsequent treatment depends upon whether the film is to be developed, fixed, sensitized or otherwise processed.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A reel for holding an elongate strip of sheet material comprising a supporting disc mounted for rotation about an axis perpendicular to the center of the disc; a spaced light-tight non-rotating closure covering one side of the disc and mounted thereon, said closure having a film passage formed in a marginal portion thereof; angularly spaced rows of radially spaced pins slidably mounted in said disc for movement from position projecting from the exterior face of said disc to position projecting from the interior or enclosed face of said disc; and means for simultaneously rotating said disc and pressing the pins inwardly in spiral succession.

2. A receptacle for supporting, protected from light, an elongate strip of sheet material comprising a peripherally grooved freely rotatable disc; a cover for enclosing one side of said disc engaging with the peripherally grooved portion thereof forming a light-tight joint; means for supporting a spiral strip of sheet material within the cover on the disc comprising angularly spaced rows of radially spaced projecting double headed pins, mounted on the disc in a manner permitting free sliding motion in a direction substantially parallel to the axis of rotation of the disc, said pins being positioned normally projecting from the outer surface of the disc but being slidable inwardly upon occasion; and means for facilitating moving inwardly of said pins comprising a spiral upstanding rib in the outer surface of the disc for guiding a pressing tool against projecting pin heads in spiral succession.

3. A receptacle for supporting, protected from light, and elongate strip of sheet material comprising a shallow cylindrical casing closed at one end and supported with its axis extending in a substantially horizontal direction; radially slidable gates in peripheral parts of said casing normally closing light-tight openings formed therein; a disc shaped cap for said casing, peripherally grooved to receive the casing sides forming a light-tight joint while permitting free rotation of the cap with respect to the casing; means for holding the cap upon the casing without inhibiting relative rotation thereof comprising a peripherally grooved hub centrally located on the inner face of the cap and resilient fingers on the inner surface of the casing engaging the grooved portion of the hub; means on the hub for holding an end of a strip of sheet material; means for supporting a spiral strip of sheet material within the casing on the cap comprising angularly spaced rows of radially spaced projecting double headed pins, mounted on the cap in a manner permitting free sliding movement in a direction substantially parallel to the axis of rotation of the cap, said pins being positioned normally projecting from the outer surface of the cap but being slidable inwardly upon occasion; means for facilitating moving inwardly of said pins comprising a spiral rib on the outer surface of the cap for guiding a pressing tool against projecting pin heads in spiral succession during rotation of the cap; said casing having an opening formed in a side portion thereof through which strip material can pass and a sliding door operable from the exterior of the casing for closing light-tight said opening and holding a projecting end portion of strip material positioned therein.

4. A reel for holding an elongated sheet of material, comprising a supporting disc, a spaced light-tight closure covering one side of the disc and mounted thereon said disc being rotatable in respect to the closure, said closure having a film passage formed in a marginal portion thereof, angularly spaced rows of radially spaced pins slidably mounted in said disc for movement from one position projecting from the exterior face of said disc to position projecting from the interior or closed face of said disc, and means for pressing the pins inwardly in spiral succession.

EDWARD E. CASSIDY.